United States Patent
Toomajanian

[11] 3,820,927
[45] June 28, 1974

[54] DUAL LAYER CROSSHEAD SYSTEM

[75] Inventor: Vasken R. Toomajanian, Needham, Mass.

[73] Assignee: Boston Insulated & Cable Co., Dorchester, Mass.

[22] Filed: June 29, 1972

[21] Appl. No.: 267,585

[52] U.S. Cl. .............................. 425/113, 425/133
[51] Int. Cl. ..................................... B29f 3/10
[58] Field of Search ........... 425/133, 141, 113, 172, 425/131

[56] References Cited
UNITED STATES PATENTS

| | | | |
|---|---|---|---|
| 3,023,461 | 3/1962 | Sherman | 425/326 B X |
| 3,054,142 | 9/1962 | Hinderer | 425/113 X |
| 3,222,721 | 12/1965 | Reynolds | 425/113 |
| 3,461,197 | 8/1969 | Lemelson | 425/113 X |
| 3,502,752 | 3/1970 | Brown | 425/141 X |
| 3,538,547 | 10/1970 | Drabb | 425/133 X |
| 3,546,743 | 12/1970 | Roth | 425/133 X |
| 3,692,448 | 9/1972 | Menasoff | 425/113 |
| 3,694,119 | 9/1972 | Scheibling | 425/131 |

Primary Examiner—R. Spencer Annear
Assistant Examiner—John S. Brown

[57] ABSTRACT

A dual layer extrusion crosshead having internal tooling arranged to provide lengths of concentric annular composite layers. The two layers, which can be rubber or rubber-like, thermoplastic or thermosetting or other extrudable materials, either similar or dissimilar, are fed into the crosshead by two different extrusion machines. After the material flows into the crosshead from either extrusion machine, the material is diverted around a mandrel and converted into an annulus discharging portion at a nozzle which is adjustable to obtain a uniform radial thickness. The next layer from a second extruder is diverted around a second mandrel positioned coaxially about the inner mandrel and the material is converted into a second annulus formed about the inner annulus. Its thickness is also adjustable.

The outer layer is molded to the inner layer just before the composite leaves the exit die. The mandrel and flow control system is convertible such that the inner annular layer can be formed from material from either extrusion machine. Thus, composite dual layers can be generated for application to an electric conductor or cable or other core or a coreless tube may be formed. The relative thickness of each layer may be regulated by the speed of each extrusion machine which can be electrically coordinated for uniform thickness control over any desired speed range.

7 Claims, 2 Drawing Figures 3,820,927

DUAL LAYER CROSSHEAD SYSTEM

BACKGROUND OF THE INVENTION

The present invention relates to machines for producing laminated tubular structures, particularly for improved electrical cables and more specifically, to extrusion crossheads which can be used for simultaneously forming and fusing layers of two dissimilar materials.

In the manufacture of laminated tubular products, there is a frequent requirement that the layers be of two dissimilar materials. This is true of various hoses, tubing and piping but it is especially important in fabricating electrical cable where dielectric properties, mechanical strength, abrasion resistance and other specific properties must all be considered. Such dissimilar materials are currently applied in separate stages either in tandem using two complete machines and crossheads spaced apart, or alternatively, a single machine and crosshead with which both layers of extrusion to be applied sequentially. With either mode of operation, there is a danger that the extruded materials do not come into intimate contact with each other. In the case of a high voltage cable where the primary coating is a semi-conductive extrudate, there is a great risk that the partially completed electric conductor will get damaged before or during the second, or subsequent, extrusion operation. Moreover, it is highly likely that voids, space or entrapped gas will exist at the extrudate interface. Such faults can lead to the loss of intimate layer contact in service, thereby creating electrical stress points where contaminated, damaged, or discontinuous semi-conductive surfaces occur. Electrical discharge leading to degradation of the material and consequent electrical failure of the cable can and does take place at such points.

Also, in the manufacture of electric cables, special protective jacketing or sheathing is often required. Some such cable sheaths require two different materials applied in two succeeding operations. An adhesive layer at the interface of the two layers is commonly used in an attempt to obtain the necessary strength, the required degree of tightness and absence of voids or space. An example of these products is found in certain watertight cables. The use of a dual-layer crosshead and simultaneous extrusion greatly enhances interface adhesion without chemical adhesives, and, because of the intimate void-free lamination obtained, an optimum degree of watertightness is achieved.

In other electrical conductors very thin insulation and sheath coatings are needed. These may be composed of as little as one-sixteenth of an inch of rubber or rubber-like materials, which, due to rheological limitations, are extremely dfficult to apply as individual layers. Consequently, the industry has been forced to resort to sheaths of excessive radial thickness.

Use of the dual-layer crosshead and simultaneous extrusion of the present invention has permitted useful and successful sheath extrusion of less than 1/16 inch radial thicknesses, and in certain applications, annular composite extrusions are possible with synthetic or natural rubber or rubber-like materials as sheathing down to .003 or less. In fact, simultaneous extrusion of two rubber-like materials at extrusion thicknesses less than what has been considered the rheological limit of single annular extrusions is possible with the common die and crosshead of the present invention. A significant saving in materials and reduction in size result.

A feature of this invention is the employment of convertible tools in the crosshead. Flow-diverting inserts disposed in the extrusion head enable the extrudate from a given extrusion machine to flow into an inner annular exit or an outer annular exit of a common die. Thus, each extrusion machine is operative upon only one given material. By rotating the flow-diverting insert 180°, a given material can be applied as either the inner or the outer layer of a composite structure. In the case of high voltage cables, one extrusion machine can be filled with semi-conductive extrudable material and another with insulant. The tooling in the dual-layer crosshead can be set so that the semi-conductive coating is applied to a bare electrical conductor and the insulation is co-extruded directly upon the semi-conductive layer. In cases where a tightly bonded semi-conductive layer is required over the insulant, as in certain high voltage power cables, the convertible, rotatable feature of the disclosed crosshead permits the simultaneous extrusion of a semi-conductive inner layer and a dielectric insulant over the bare electric conductor with the crosshead tools in a primary position. The insert assembly may then be rotated 180°, and without disturbing the extrusion machines or changing materials, the balance of a desired thickness of dielectric insulation layer may be added during the simultaneous application of an outer radial thickness of semi-conductive extrudate over the complete composite.

BRIEF DESCRIPTION OF THE PREFERRED EMBODIMENT

Figure 1:
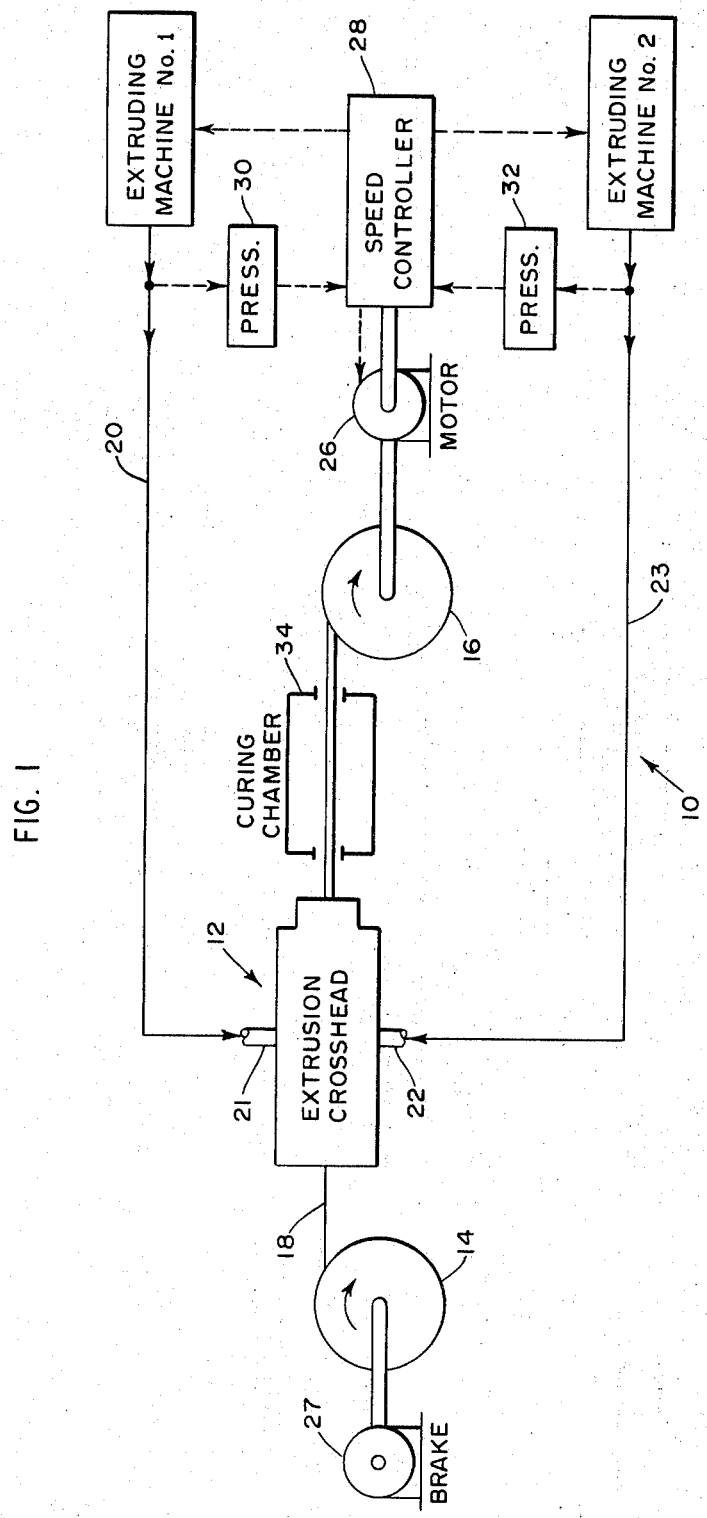
FIG. 1 illustrates in diagrammatic format a system for drawing a cable through the mold and apparatus for controlling the rate of injecting material into the several chambers coordinated with the speed of drawing the cable.

In FIG. 1 of the drawing, there is shown a dual-layer extrusion system 10 which embodies principles of the invention. It includes a dual-layer crosshead 12, reels 14 and 16 for drawing a cable 18 through the crosshead 12. Extruding machine No. 1 is shown diagrammatically connected by way of a conduit 20 to a radial opening 21 and extrusion machine No. 2 is similarly shown connected by way of a conduit 22 to a radial opening 23 in the crosshead 12. The openings 21 and 23 are at diametrically opposite points.

A motor 26 may rotate the reel 16 to draw the cable 18 from the reel 14 to which a brake is coupled to keep the cable 18 taut. A control system 28 regulates the speed of the motor 26, and the output of the extruding machines by conventional means such as the pressure sensors 30 and 32 and feedback loops so that material is pumped at a rate commensurate with the draw speed of the cable 18. The control system 28 may include conventional servomechanism coupled to the motor 26, as well as the pressure sensors 30 and 32 coupled to the conduits 20 and 22 so as to be responsive to both the motor speed as well as the pressure exerted upon the conduits 20 and 22 as material is forced through the crosshead 12. Upon exiting from the crosshead 12, the cable 18 passes through a curing chamber 34, which, by way of example, may heat, cool or provide a steam bath for curing material laminated upon the cable 18, the method of curing depending on the particular materials utilized in the lamination.

Figure 2:
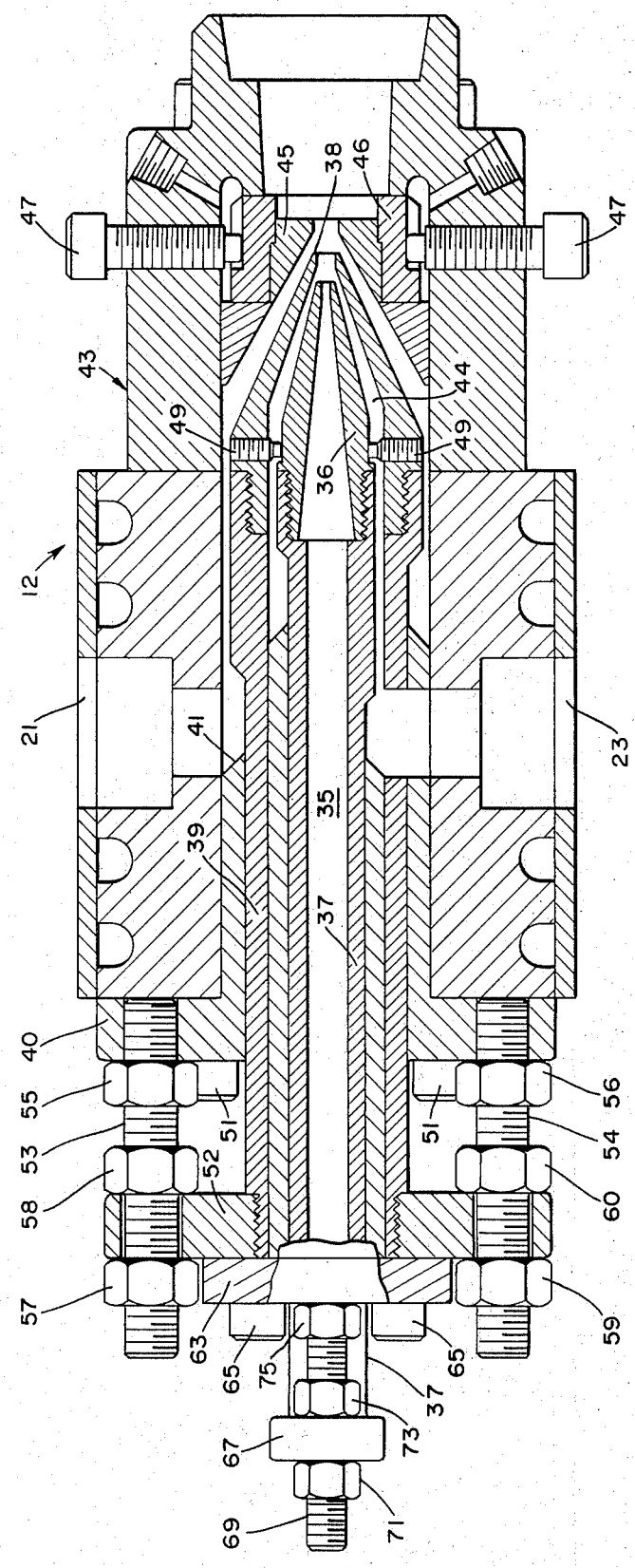
FIG. 2 of the drawing is a view of the dual-layer extrusion crosshead cut away to expose an axial section of the several chambers and the single die.

Turning to FIG. 2 of the drawing, there may be seen detail of the crosshead 12. There is a central passage 35 to accommodate a cable. The passage 35 decreases in diameter in an inner guider tip 36 which is screwed into an inner core tube 37 within which the central passage 35 is formed.

Concentric with the inner guider tip 36 is an outer guider tip 38 screwed into an outer core tube 39 which is concentric with the inner core tube 37. A flanged sleeve 40 is held in the body of the crosshead 12 by cap screws 51 and the sleeve 40 serves as a holder for the outer core tube 39. A tapered portion 41 of the sleeve 40, a portion of the outer surface of the core tube 39 and a tapered shoulder on the core tube 39 serve as the bottom of the opening 21 for purposes made clear hereinbelow.

At the right hand side of the dual layer crosshead, as it is shown in FIG. 2, there may be seen a block 43 which is rigidly attached to the body of the crosshead 12 by conventional means. A central opening 44 aligned with and matching a similar opening in the crosshead body 12 accommodates a die 45 secured in place by means of a wedge ring 46 which, in turn, is adjustably retained in the opening by means of four cap screws 47 threaded into the block 43 at points 90° apart. The cap screws 47 permit adjustment of the wedge ring 46 and the die 45 relative to the outer guider tip 38, thus assuring concentricity of the die 45 and the tip 38. The inner surface of the die 45 tapers to a terminal opening or tip slightly larger than and concentric with the tapered surfaces of the guider tips 36 and 38. Four set screws 49 are threaded into the guider tip 38 at points 90° apart from each other. They bear upon the outer surface of the inner guider tip 36 and permit adjustment of the inner guider tip 36 relative to the guider tip 38 to eliminate any eccentricity.

The outer core tube holder 40 is bolted to the body 12 of the crosshead by means of four symmetrically arranged cap screws 51 as noted above. The outer core tube 39 is threaded into a roughly elliptical base member 52 having openings adjacent its narrow ends, which openings are fitted over threaded rods 53 and 54. The threaded rods 53 and 54 are screwed into the outer core tube holder 40 and locked in position by nuts 55 and 56. Similar nuts 57, 58, 59 and 60 are threaded on the rods 53 and 54 and their position on the rods determines the position of the base 52 as well as the axial position within the block 43 of the entire assembly of the inner guider tip 36 and the guider tip 38.

The inner core tube 37 is enclosed in an inner core tube holder 63 which, like the outer core tube holder 40, includes a flanged section which is bolted by means of cap screws 65 to the member 52. The inner core tube 37 is threaded into a generally elliptical member 67 which, like the elliptical member 52, has openings through which a pair of threaded rods 69 pass. Only one of the threaded rods 69 is visible in the drawing but the two are identical and each has nuts 71 and 73 threaded on the rods to permit the inner core tube and the guider tip 36 to be locked in any desired axial position. The rods 69 are screwed into the inner core tube holder 63 and are locked by means of hex nuts 75.

Thus, it may be seen that a variety of adjustments are available to regulate the thickness of either an outer or inner extrudate. Also the concentricity of the extruded cores is adjustable and, it is possible to cause the extrudate entering the opening 21 to become either the inner or outer layer of extrudate, the same being true of the extrudate entering the opening 23. Such conversion is achieved by simply releasing the cap screws 51 and turning the entire assembly of flow-diverting 180°. The holder 40 may then be firmly attached in its new position.

With the apparatus of the invention set as shown in FIG. 2, fluid material such as rubber type materials, thermosetting or thermoplastic materials may be injected into the openings 21 and 23. Material in the opening 23 bottoms against the outer surface of the inner core tube 37 which serves as a flow-diverting mandrel to force the material into the area between the inner core tube 37 and the outer core tube 39. From that area, it enters the conical chamber formed between the inner guider tip 36 and the guider tip 38. At the nozzle formed by the exit of that chamber, it is laminated as an annular layer upon the central cable.

Similarly, material in the opening 21 bottoms against the outer core tube 39 which also serves as a flow-diverting mandrel to force the material into the area between the outer core tube 39 and the body of the crosshead 12. From that area, it enters the conical chamber defined on the inside by the guide tip 38 and on the outside by the die 45. The material then exits from the nozzle of the conical chamber and is laminated as a further annular layer upon the material exiting from the inner guider tip 36.

These materials are tightly laminated upon the cable and upon each other in intimate void-free relation and without being exposed to possible contaminants or impurities. As has been noted above, the set screws 49 permit the inner guider tip 36 to be adjusted in position to eliminate eccentricity. Similar control of eccentricity in the outer layer is available by adjustments of the die holder or wedge ring 46 through proper settings of the screws 47. Also, the axial adjustments available for the guider tips permit close control of thickness of the annuli and, removal and 180° rotation of the internal assembly in the crosshead provides convertibility or the use of material from either extruding machine to form the inner or the outer layer.

Finally, a last adjustment feature is possible by substituting a complete die housing for that shown attached to the crosshead.

What is claimed is:

1. A dual layer extrusion system for forming laminated tubular products comprising a crosshead having two radially disposed entry ports for the injection of extrudable materials, means disposed within said crosshead for guiding one of said materials through said crosshead and forming it into a first tubular layer, means for guiding the other of said materials through said crosshead and forming it into a second tubular layer concentric with said first tubular layer said first tubular layer being formed at a point closely adjacent the point of contact with said second tubular layer, adjustable means for assuring concentricity of said guiding means of one of said materials with said guiding means of the other of said materials, a die tip for fusing said tubular layers together as they exit from said crosshead, adjustable means for assuring concentricity of said die tip with said guiding means and convertible means for connecting either of said entry ports to either said means for guiding one of said layers through said crosshead or said means for guiding the other of said materials through said crosshead.

2. A dual layer extrusion system as defined in claim 1 wherein said crosshead has an axial opening formed therethrough, said die tip also having an opening formed therethrough, said axial opening in said crosshead being concentric and in communication with said opening in said die tip whereby a wire may be drawn through said crosshead and said die tip, and means for drawing said wire through said die tip and crosshead, said tubular layers being fused to said wire at said die tip.

3. A dual layer extrusion system as defined in claim 1 wherein a source of extrudable materials is connected to each of said entry ports.

4. A dual layer extrusion system as defined in claim 3 wherein said means for guiding one of said materials terminates in a first nozzle, said nozzle being adjacent said die tip.

5. A dual layer extrusion system as defined in claim 4 and further including support means for said first nozzle adjustably attached to said crosshead, and means for locking said support means to said crosshead in any one of a range of positions whereby the distance between said nozzle and said die tip may be adjustably set.

6. A dual layer extrusion system as defined in claim 5 wherein said means for guiding the other of said materials terminates in a second nozzle said second nozzle being disposed adjacent and within said first nozzle.

7. A dual layer extrusion system as defined in claim 6 and further including second support means for said second nozzle adjustably attached to said crosshead, and means for locking said second support means to said crosshead in any one of a range of positions whereby the distance between said second nozzle and said first nozzle may be adjustably set.

* * * * *

UNITED STATES PATENT OFFICE
CERTIFICATE OF CORRECTION

Patent No. 3,820,927　　　　　　　　　Dated June 28, 1974

Inventor(s) Vasken R. Toomajanian

It is certified that error appears in the above-identified patent and that said Letters Patent are hereby corrected as shown below:

In [73] Change Assignee from: Boston Insulated & Cable Co.

To: Boston Insulated Wire & Cable Co.

Signed and sealed this 5th day of November 1974.

(SEAL)
Attest:

McCOY M. GIBSON JR.
Attesting Officer

C. MARSHALL DANN
Commissioner of Patents